United States Patent
Takigawa et al.

(10) Patent No.: US 6,800,161 B2
(45) Date of Patent: Oct. 5, 2004

(54) METHOD OF ARRANGING CYCLIC PATTERNS IN TIRE TREAD

(75) Inventors: Shigeaki Takigawa, Kobe (JP); Hitoshi Yoshimi, Kobe (JP); Hiroki Yokota, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 174 days.

(21) Appl. No.: 10/107,362

(22) Filed: Mar. 28, 2002

(65) Prior Publication Data

US 2003/0041949 A1 Mar. 6, 2003

(30) Foreign Application Priority Data

Mar. 28, 2001 (JP) ........................................ 2001-093515

(51) Int. Cl.[7] .......................... B29D 30/00; B60C 11/03; B60C 113/00; G06F 17/50
(52) U.S. Cl. ................................ 156/110.1; 152/209.2; 703/1; 703/6; 703/8
(58) Field of Search .......................... 156/110.1; 703/1, 703/6, 7, 8; 152/209.2

(56) References Cited

U.S. PATENT DOCUMENTS

| | | | | |
|---|---|---|---|---|
| 5,309,965 A | * | 5/1994 | Williams | 152/209.2 |
| 5,746,848 A | | 5/1998 | Schulze et al. | |
| 5,865,921 A | * | 2/1999 | Zakelj et al. | 156/110.1 |

* cited by examiner

Primary Examiner—Steven D. Maki
(74) Attorney, Agent, or Firm—Birch, Stewart, Kolasch & Birch, LLP

(57) ABSTRACT

A method of arranging cyclic patterns in a tire tread is disclosed, wherein design cycles in each cyclic pattern are repeated in a pitch sequence; with respect to each of the design cycles, an averaged pitch of the pitch lengths of a predetermined number of subsequent design cycles is obtained; combinations of the sequences of the averaged pitches are defined by changing phase between the sequences; with respect to the averaged pitches of the combined sequences, crossover averages are obtained; from the crossover averages in each combination, a difference between a maximum and a minimum is obtained; from the differences of the combinations, a combination having a smaller difference is found; the cyclic patterns are arranged in accordance with the phase shift of the combination having the smaller difference.

16 Claims, 12 Drawing Sheets

METHOD OF ARRANGING CYCLIC PATTERNS IN TIRE TREAD

The present invention relates to a method of arranging cyclic patterns in a tire tread, more particularly to a method of determining a phase shift between variable-pitch sequences in axially different circumferential regions.

In general, a tread pattern of a tire defined by tread grooves provided in the tread portion of the tire is formed by repeating a design cycle in the circumferential direction of the tire while changing the circumferential pitch length of the design cycle as well known in the art as variable pitch methods. In order to avoid simultaneity in ground contact, such a method that one half of the tread pattern on one side of the tire equator is circumferentially shifted from the other half by about one half of a pitch length is widely employed. Although this method is effective in reducing a tire noise, it is not always effective in improving other performance of the tire such as vibration during high speed running, tire uniformity and the like. For example, there is a possibility that the tangential force variation TFV, radial force variation RFV and the like become rather worse in view of vibration during high speed running. When the periodicity of such a force variation is synchronized with the natural vibration of the suspensions, spring members or the like of the car at a certain running speed, even if the amplitude thereof is small, a vibration which can be felt is caused. Such a phenomenon is liable to occur at higher harmonics such as 2nd and 4th harmonics of the tangential force variation.

It is therefore, an object of the present invention to provide a method of arranging cyclic patterns in a tire tread which can improve the tire uniformity causing vibration as well as noise performance.

According to the present invention, in a method of arranging cyclic patterns in a tire tread, wherein the tire tread comprises a number (P) of circumferential regions each provided with a cyclic pattern formed by circumferentially repeating a number (I) of design cycles having a number (J) of different pitch lengths, and the pitch lengths of the design cycles in each said circumferential region are arranged circumferentially of the tire in a sequence whereby the number (P) of sequences of the pitch lengths are defined, the improvement comprises:

obtaining, with respect to each of the design cycles, an averaged pitch of the pitch lengths of a number (n) of circumferentially subsequent design cycles to define a sequence of averaged pitches per each of the circumferential regions, whereby the number (P) of sequences of the averaged pitches are defined;

defining a number (Q) of combinations of the number (P) of the sequences of averaged pitches by changing phase between the sequences;

obtaining, with respect to the averaged pitches of the number (P) of the combined sequences in each of the combinations, a crossover average of averaged pitches, whereby a series of the crossover averages is defined per each of the combination;

obtaining, from said a series of the crossover averages, a difference between a maximum and a minimum of the crossover averages or alternatively between a maximum and a minimum of the amplitude of a harmonic of said a series of the crossover averages, with respect to each of the combinations;

finding, from the differences of the combinations, a combination having a smaller difference to determine the phase shift given to the sequences of averaged pitches in making the combination; and rearranging the cyclic patterns of the circumferential regions in accordance with the found phase shift.

An embodiment of the present invention will now be described in detail in conjunction with the accompanying drawings.

The present invention can be applied to various tires having a tread pattern as far as axially different circumferential regions of the tread have cyclic patterns respectively. The cyclic patterns can be identical or different or symmetrical or asymmetrical, namely, every combination is possible. The cyclic patterns and non-cyclic pattern if any constitute the tread pattern. In case of the tread pattern shown in FIG. 1, a central region 7 is provided with a non-cyclic pattern (rib) and each lateral region 9 is provided with a cyclic pattern (blocks), and a block-rib tread pattern is formed.

Firstly, the tread portion is axially divided into at least two circumferentially extending regions 9 having the same or almost same axial width. The number (P) of the regions 9 is usually two or three, and may be at most five.

The circumferential regions 9 are each provided with a cyclic pattern by repeating a design cycle 3 in the circumferential direction while changing the circumferential pitch length thereof. As described above, the cyclic pattern is a part of the tread pattern formed by tread grooves, and the design cycle 3 is a minimum unit repeating in the tire circumferential direction. It is preferable that all the circumferential regions 9 have the same or almost same ground contacting area. Here, the ground contacting area is the total in the circumference of the tire.

The number (J) of the different pitch lengths in each circumferential region 9 is at least three, preferably, at most ten, namely the number (J) is in a range of from 3 to 10, more preferably 3 to 7, still more preferably 3 to 5.

The total number (I) of the design cycles 3 (or the number of repetition) in each circumferential region 9 is set in a range of not less than 45, preferably not less than 50, more preferably not less than 60, but preferably at most about 120.

Thus, each circumferential region 9 is regarded as a circumferential row of design cycles $3_i$ (i is a suffix number from 1 to I) having a number (J) of different pitch lengths $L_j$ (j is a suffix number from 1 to J).

Pitch Sequence

The sequence of the pitch lengths $L_j$ in each circumferential region 9 (hereinafter the "pitch sequence") may be determined according to various methods. It is however, preferable that the ratio ($L_j/L_1$) of the longest pitch length $L_j$ to the shortest pitch length $L_1$ is set in a range of from 1.20 to 1.70 in view of uneven wear and uniformity.

Figure 3:
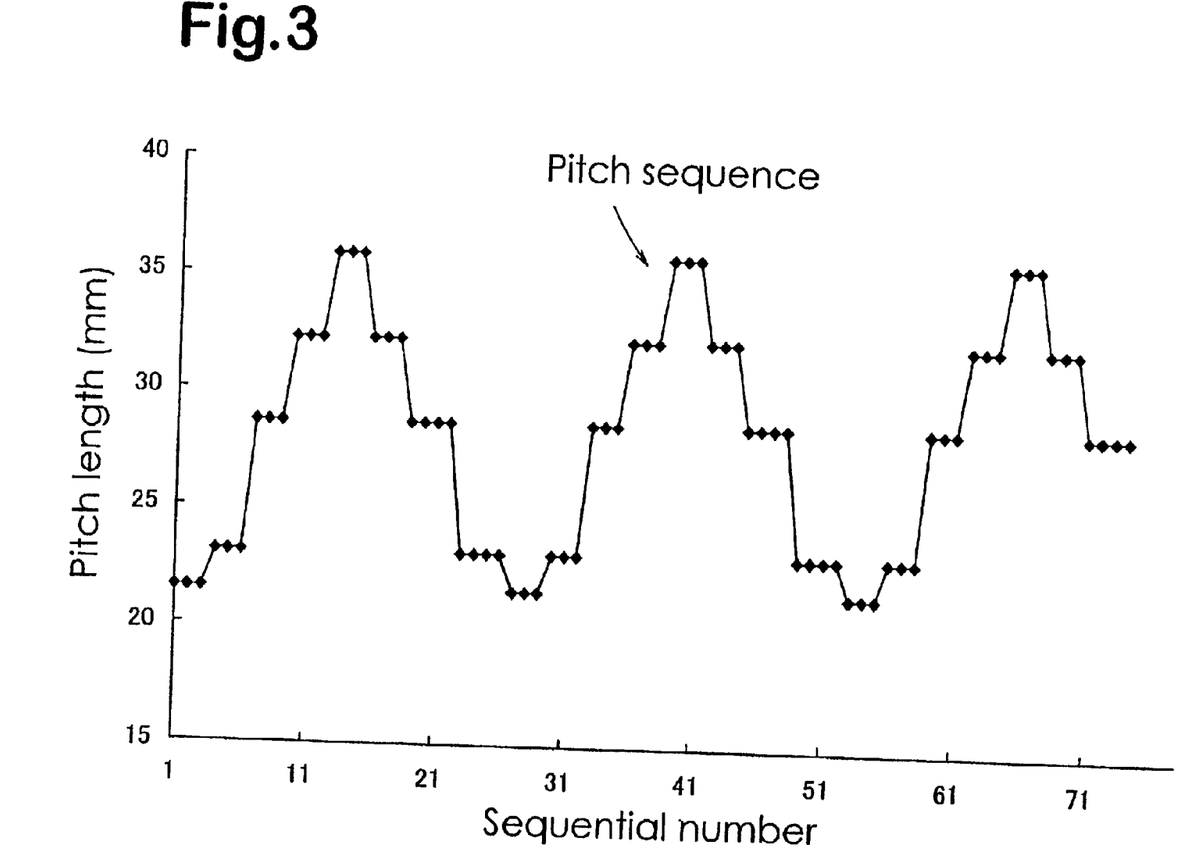
FIG. 3 shows a pitch sequence.

FIG. 3 shows an example of the pitch sequence, wherein the pitch length varies cyclically and gradually between a minimum and a maximum. (hereinafter, the "periodic arrangement")

Figure 4:
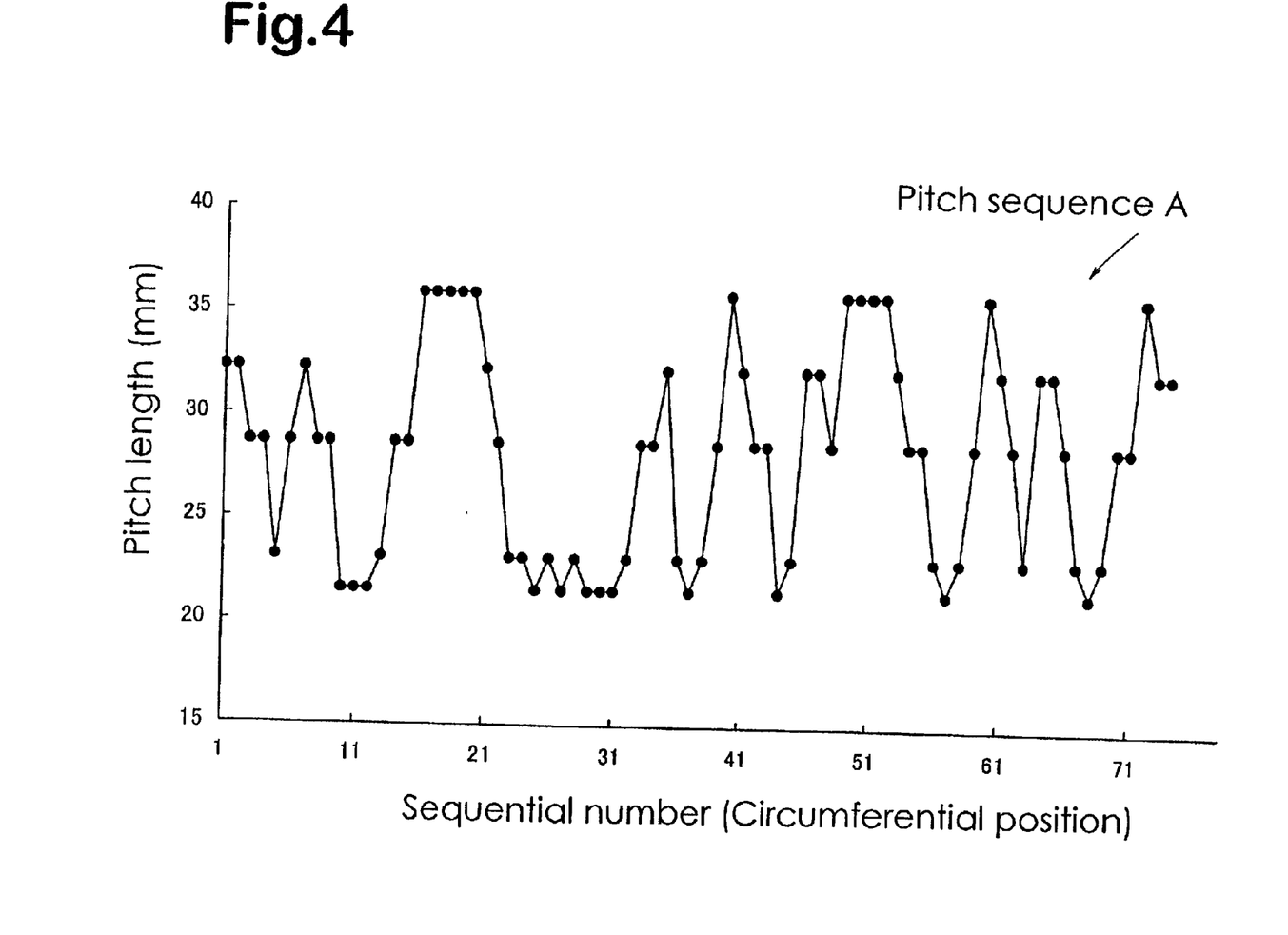
FIG. 4 shows another example of the pitch sequence.

FIG. 4 shows another example of the pitch sequence, wherein, in contrast with the above-mentioned periodic arrangement, the pitch length varies aperiodically. (hereinafter the "aperiodic arrangement") This aperiodic arrangement (A) will be seen as random at first glance. Such aperiodic arrangement may be generated by a computer using a random-number-generating function or a chaos function based on the input data on the number (J) of the different pitch lengths L, the total number (I) of the design cycles 3 and the like.

Averaged-Pitch Sequence

In each of the pitch sequences of the circumferential regions 9, with respect to each design cycle $3_i$, a predetermined number (n) of subsequent design cycles $3_i$ to $3_{i+n}$ are defined in one circumferential direction, and the average of the pitch lengths of the subsequent design cycles $3_i$ to $3_{i+n}$ (hereinafter, the "averaged pitch length") is found. Incidentally, the suffix number returns to the start if reached to the end.

As a result, a sequence of the averaged pitch lengths (hereinafter, the "averaged-pitch sequence") whose number is equal to the total number (I) of the design cycles 3 is formed per each of the pitch sequences.

Figure 5:
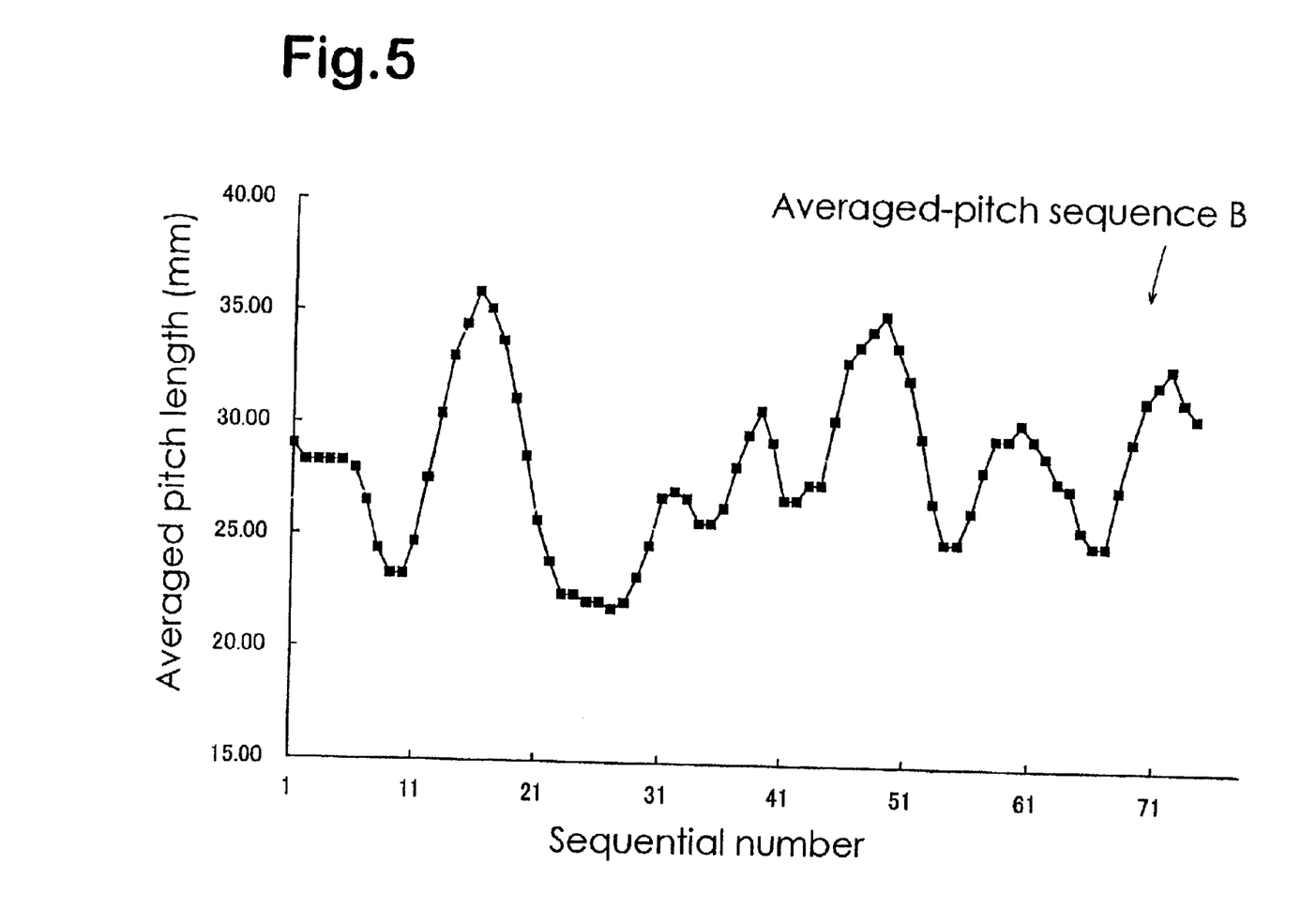
FIG. 5 shows an averaged-pitch sequence of the pitch sequence shown in FIG. 3.

If the pitch lengths and averaged pitch lengths are sequentially plotted as shown in FIGS. 4 and 5, respectively, a waveform of the envelope of the pitch sequence (A) is different from a waveform of the envelope of the averaged-pitch sequence (B) although the sequence (B) originates from the sequence (A).

Combination of Averaged-Pitch Sequences

Next, a combination of the averaged-pitch sequences of the circumferential regions 9 wherein the averaged-pitch sequences are not shifted and combinations wherein the averaged-pitch sequences are shifted relatively to one another in the circumferential direction of the tire are defined as many as possible by changing the amount of shift (hereinafter the "phase shift"). In other words, each combination is provided with a phase shift in combining the averaged-pitch sequences. Here, the phase shift is a comprehensive term. When the number of the combined averaged-pitch sequences is two, the phase shift means the only one phase shift therebetween. If the number is three or more, it means two or more phase shifts between them.

Figure 6:
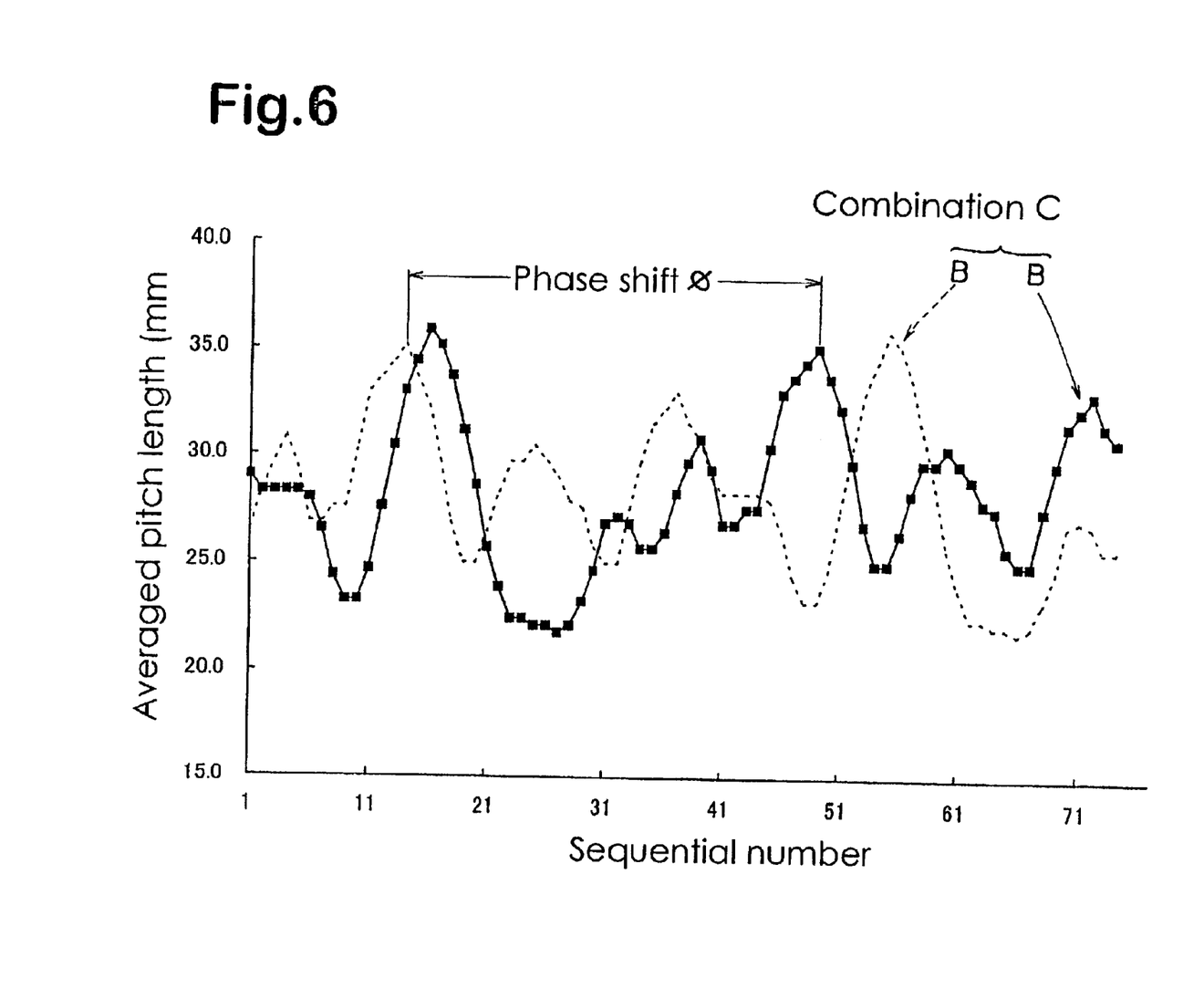
FIG. 6 shows a combination of the two identical averaged-pitch sequences shown in FIG. 5.

FIG. 6 shows a combination (C) of two identical averaged-pitch sequences (B) between which a phase shift Φ is given.

Crossover Average

With respect to each of the combinations, the average of the averaged pitch lengths of the circumferential regions 9 (hereinafter the "crossover average") is found at each of a plurality circumferential positions, whereby a sequence of the crossover averages is formed per each of the combinations. Here, the circumferential positions at which the crossover average is found or calculated are ideally equiangular positions around the tire axis. By applying a interpolation to the crossover averages, the equiangular positions can be determined independently from the total number (I) of the design cycles. In practice, however, as the variation of the pitch lengths is not so large, the sequential number of the design cycles is used as a pointer indicating the circumferential position or the distance from a given point.

Figure 7:
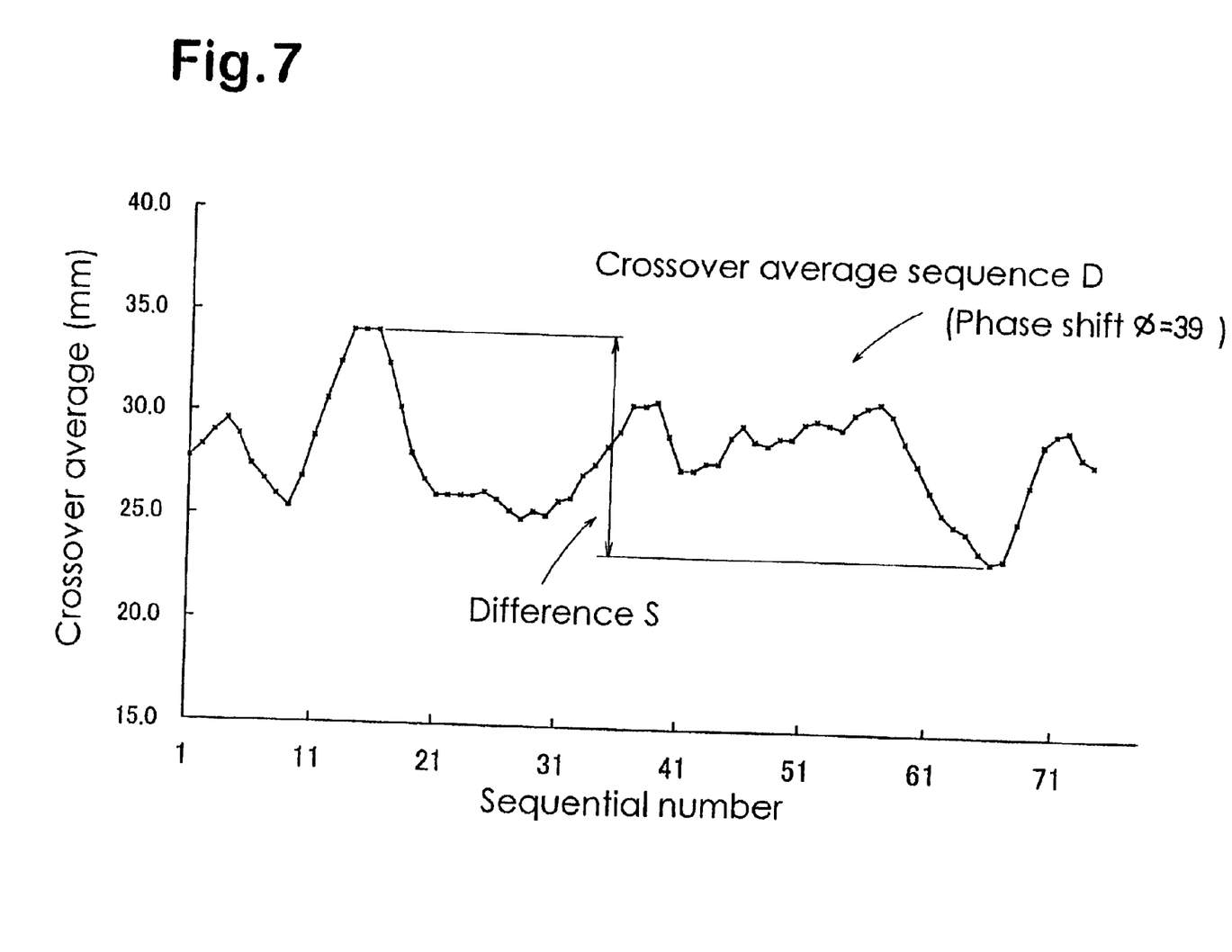
FIG. 7 is a crossover average sequence of the combination of FIG. 6 showing a difference S.

In FIG. 7, the crossover averages of the above-mentioned combination (C) are plotted sequentially (hereinafter the "crossover average sequence"). The envelope thereof again describes a waveform different of the above-mentioned two waveforms.

Less Difference in Crossover Average

Each of the crossover average sequences may have a maximum crossover average and a minimum crossover average and accordingly, there is a certain difference S between the maximum and minimum.

From the crossover average sequences, a sequence of which difference S is minimum or under a predetermined level is found. In other words, from the waveforms of crossover averages of the combinations, a flatter waveform is found. In this regard, it may be said that a flatter waveform was found with respect to the fundamental wave of the waveform of crossover averages. But it is also possible to use a higher harmonic such as 2nd or 4th harmonic instead of the waveform as it is in finding a flatter waveform or a minimum or smaller difference S. Incidentally, such a higher harmonic can be obtained by utilizing a well known Fourier expansion of the waveform.

The sequence (or waveform) which is so found out has a specific phase shift which was given between the averaged-pitch sequences in combining them. Of course, there is a possibility that the phase shift is zero.

According to this found-out phase shift, the above-mentioned cyclic patterns of the circumferential regions 9 are rearranged by giving the found-out phase shift between them.

Figure 1:
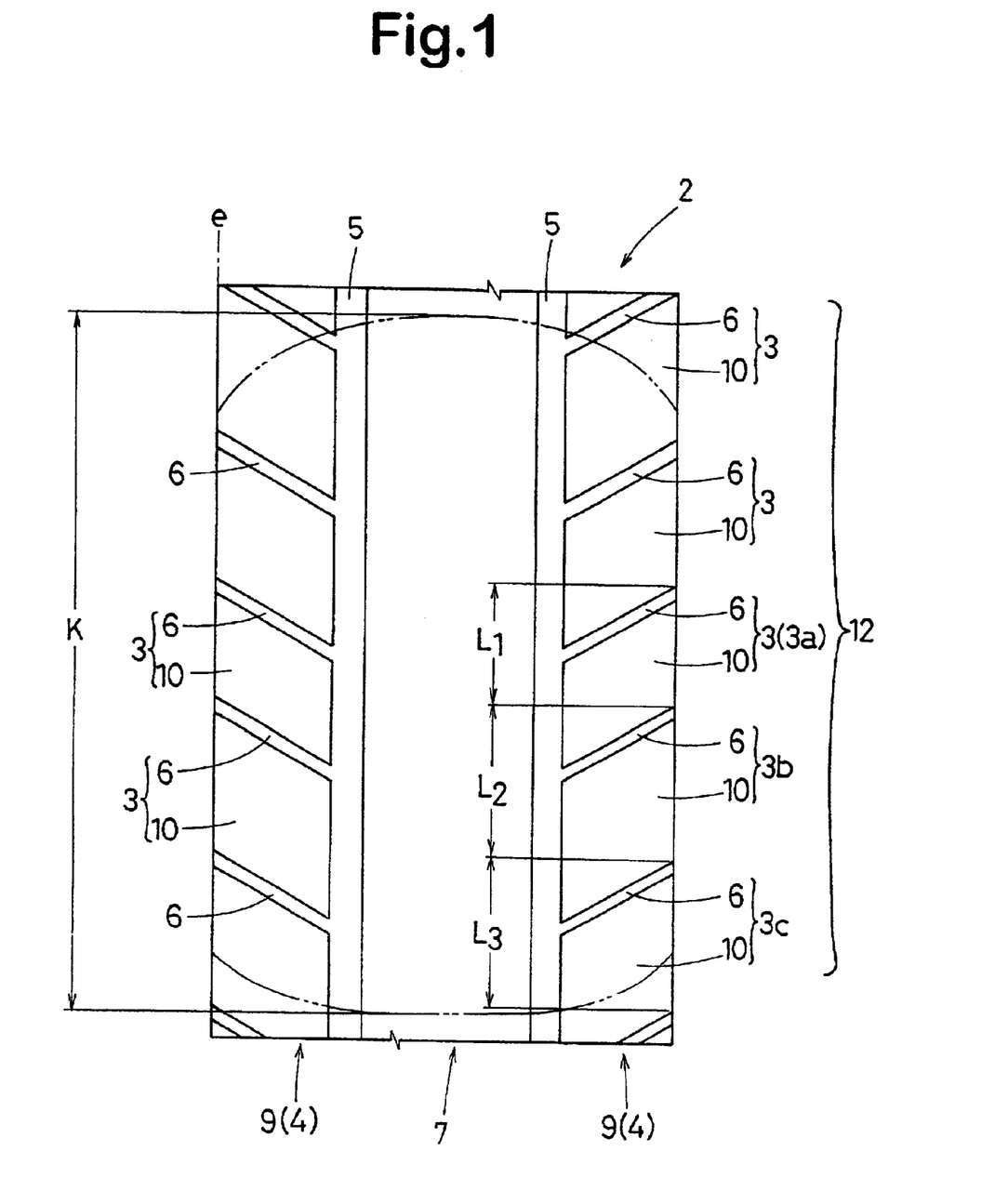
FIG. 1 is a developed plan view of a tire showing a design cycle.

Next, according to the tread pattern shown in FIG. 1, a more concrete description is made.

In FIG. 1, a tread portion 2 of a pneumatic tire 1 of size 225/60R16 for passenger cars is shown together with an exemplary ground contacting patch by a two-dot chain line.

The tread portion 2 is provided with two circumferential grooves 5 extending circumferentially of the tire and axial grooves 6 extending from the circumferential grooves 5 to the tread edge (e). The central circumferential region 7 between the two circumferential grooves 5 is formed as a circumferentially continuously extending rib 7, and a cyclic pattern is not provided. The two lateral circumferential regions 9 axially outside the circumferential grooves 5 are each formed as a row 4 of blocks 10. In this example, the method is applied to the two lateral regions 9.

In this case, namely, in case of a row of blocks, a design cycle 3 may be made up of a complete block 10 and an adjacent axial groove 6. Thus, the borders between design cycles 3 lie along the axial groove edges on the same side. It is however, not always necessary that the borders are on the axial groove edges. The borders may be on the top faces of the blocks for example.

Figure 2A:
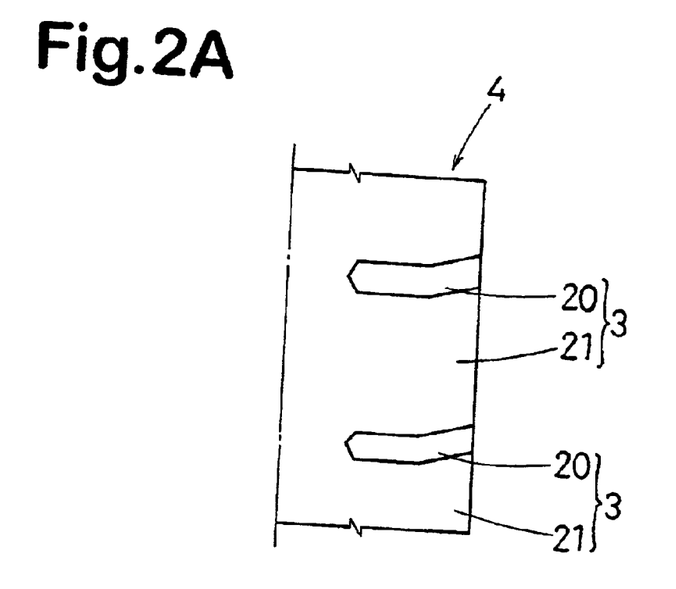
FIG. 2A shows another example of the design cycle.

In case of a rug pattern as shown in FIG. 2A which comprises rug grooves 20 extending axially inwardly from the tread edges and having an closed end, a design cycle 3 may be made up of one of the rug grooves 20 and one of portions 21 therebetween which adjoins the rug groove 20.

Figure 2B:
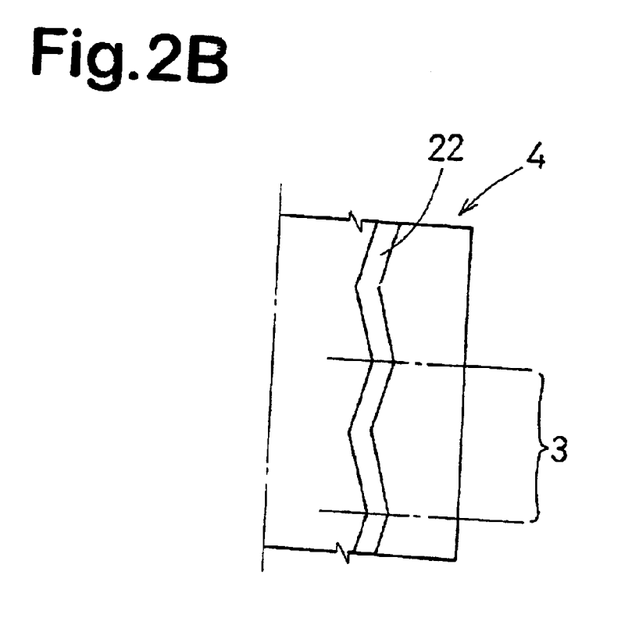
FIG. 2B shows still another example of the design cycle.

In case of a rib pattern as shown in FIG. 2B which comprises a zigzag circumferential groove 22, a design cycle 3 may be defined as a circumferential part corresponding to one cycle of the zigzag.

First, in each of the lateral regions 9, an arrangement of design cycles $3a, 3b, 3c, 3d, 3e$ having different pitch lengths $L_1, L_2, L_3, L_4, L_5$ (short to long order) is defined. In other words, a sequence of the pitch lengths $L_1$–$L_5$ is determined. As mentioned above, the ratio ($L_5/L_1$) of the longest pitch length $L_5$ to the shortest pitch length $L_1$ is set in a range of from 1.20 to 1.70. In this example, both of the circumferential width of the axial groove 6 and the circumferential length of the block 10 increase as the pitch length L increases.

The pitch lengths $L_1$–$L_5$ are as follows.

| Design cycle | Pitch length | mm |
|---|---|---|
| 3a | L1 | 21.54 |
| 3b | L2 | 23.12 |
| 3c | L3 | 28.7 |
| 3d | L4 | 32.28 |
| 3e | L5 | 35.89 |

$L5/L1 = 1.67$

Incidentally, in determining the pitch lengths of an existing cyclic pattern, there is a possibility that the pitch length varies depending on the axial position if for example the inclination of the axial groove 6 is changed between the circumferentially adjacent axially grooves 6. In such a case, if the pitch lengths are defined at a definite axial position such as the axial edge or end (in this example, at the tread edge e), it may be enough for achieving the advantageous results. Thus, the determination of the pitch lengths of an existing cyclic pattern is not essential for the present invention. In the present invention, after the pitch sequences are decided, it is possible to change the configurations of tread grooves and/or ground contacting elements such as block, rib and the like.

In this example, the two lateral regions 9 are provided with identical pitch sequences (A) although the cyclic patterns are mirror symmetry about the tire equator. But, it is also possible to use different pitch sequences. The total number (I) of the design cycles 3 is 74.

The pitch sequence (A) is as follows.

| | |
|---|---|
| 1 | 32.28 |
| 2 | 32.28 |
| 3 | 28.7 |
| 4 | 28.7 |
| 5 | 23.12 |
| 6 | 28.7 |
| 7 | 32.28 |
| 8 | 28.7 |
| 9 | 28.7 |
| 10 | 21.54 |
| 11 | 21.54 |
| 12 | 21.54 |
| 13 | 23.12 |
| 14 | 28.7 |
| 15 | 28.7 |
| 16 | 35.89 |
| 17 | 35.89 |
| 18 | 35.89 |
| 19 | 35.89 |
| 20 | 35.89 |
| 21 | 32.28 |
| 22 | 28.7 |
| 23 | 23.12 |
| 24 | 23.12 |
| 25 | 21.54 |
| 26 | 23.12 |
| 27 | 21.54 |
| 28 | 23.12 |
| 29 | 21.54 |
| 30 | 21.54 |
| 31 | 21.54 |
| 32 | 23.12 |
| 33 | 28.7 |
| 34 | 28.7 |
| 35 | 32.28 |
| 36 | 23.12 |
| 37 | 21.54 |
| 38 | 23.12 |
| 39 | 28.7 |
| 40 | 35.89 |
| 41 | 32.28 |
| 42 | 28.7 |
| 43 | 28.7 |
| 44 | 21.54 |
| 45 | 23.12 |
| 46 | 32.28 |
| 47 | 32.28 |
| 48 | 28.7 |
| 49 | 35.89 |
| 50 | 35.89 |
| 51 | 35.89 |
| 52 | 35.89 |
| 53 | 32.28 |
| 54 | 28.7 |
| 55 | 28.7 |
| 56 | 23.12 |
| 57 | 21.54 |
| 58 | 23.12 |
| 59 | 28.7 |
| 60 | 35.89 |
| 61 | 32.28 |
| 62 | 28.7 |
| 63 | 23.12 |
| 64 | 32.28 |
| 65 | 32.28 |
| 66 | 28.7 |
| 67 | 23.12 |
| 68 | 21.54 |
| 69 | 23.12 |
| 70 | 28.7 |
| 71 | 28.7 |
| 72 | 35.89 |
| 73 | 32.28 |
| 74 | 32.28 |

This pitch sequence (A) is also shown in FIG. 4, wherein the vertical axis shows the pitch length in mm and the horizontal axis shows the sequential number from 1 to 74 (thus approximate circumferential positions are shown).

In this example, as the two lateral regions 9 have the identical pitch sequence (A), an averaged-pitch sequence (B) is defined with respect to only the pitch sequence (A).

First, the number (n) of the subsequent design cycles $3_i$ to $3_{i+n}$ is determined based on the ground contacting length (K) of the tire. In general, as shown in FIG. 1, three to seven design cycles are included within the ground contacting length (K) with respect to each of the circumferential regions 9. Therefore, the number (n) is selected from in a range of three to seven. If there is a large difference in number between the circumferential regions 9, an integer approximate to the average thereof may be used. In this example, five is selected. (n=5)

With respect to each of the design cycles $3_i$ (i=1 to 74), the average (Lx+Ly)/2 of the pitch lengths Lx and Ly of five subsequent design cycles $3_i$ to $3_{i+5}$ is calculated to define an averaged-pitch sequence. (Lx=one of L1–L5, Ly=one of L1–L5)

The following is the averaged-pitch sequence (B) of the above-mentioned pitch sequence (A).

| | |
|---|---|
| 1 | 29.02 |
| 2 | 28.3 |
| 3 | 28.3 |
| 4 | 28.3 |
| 5 | 28.3 |
| 6 | 27.98 |
| 7 | 26.55 |
| 8 | 24.4 |
| 9 | 23.29 |

-continued

| | |
|---|---|
| 10 | 23.29 |
| 11 | 24.72 |
| 12 | 27.59 |
| 13 | 30.46 |
| 14 | 33.01 |
| 15 | 34.45 |
| 16 | 35.89 |
| 17 | 35.17 |
| 18 | 33.73 |
| 19 | 31.18 |
| 20 | 28.62 |
| 21 | 25.75 |
| 22 | 23.92 |
| 23 | 22.49 |
| 24 | 22.49 |
| 25 | 22.17 |
| 26 | 22.17 |
| 27 | 21.86 |
| 28 | 22.17 |
| 29 | 23.29 |
| 30 | 24.72 |
| 31 | 26.87 |
| 32 | 27.18 |
| 33 | 26.87 |
| 34 | 25.75 |
| 35 | 25.75 |
| 36 | 26.47 |
| 37 | 28.31 |
| 38 | 29.74 |
| 39 | 30.85 |
| 40 | 29.42 |
| 41 | 26.87 |
| 42 | 26.87 |
| 43 | 27.58 |
| 44 | 27.58 |
| 45 | 30.45 |
| 46 | 33.01 |
| 47 | 33.73 |
| 48 | 34.45 |
| 49 | 35.17 |
| 50 | 33.73 |
| 51 | 32.29 |
| 52 | 29.74 |
| 53 | 26.87 |
| 54 | 25.04 |
| 55 | 25.04 |
| 56 | 26.47 |
| 57 | 28.31 |
| 58 | 29.74 |
| 59 | 29.74 |
| 60 | 30.45 |
| 61 | 29.73 |
| 62 | 29.02 |
| 63 | 27.9 |
| 64 | 27.58 |
| 65 | 25.75 |
| 66 | 25.04 |
| 67 | 25.04 |
| 68 | 27.59 |
| 69 | 29.74 |
| 70 | 31.57 |
| 71 | 32.29 |
| 72 | 33 |
| 73 | 31.56 |
| 74 | 30.85 |

This averaged-pitch sequence (B) is also shown in FIG. 5, wherein the vertical axis shows the averaged pitch length in mm, and the horizontal axis shows the sequential number.

Next, combinations of the two averaged-pitch sequences (B) and (B) are defined by changing the phase shift Φ between them. In this example, the phase shift change is made at the step of the sequential number, and as a result, seventy-four combinations was defined.

FIG. 6 shows one of the combinations (C) provided with a phase shift Φ which is 39 (39 design cycles).

In each of the combinations, the average (crossover average) of the averaged-pitches of the same order or the same sequential number in the combined averaged-pitch sequences is found over the sequential number, whereby a sequence (D) of the crossover averages is formed. Thus, the number of the sequences (D) is equal to that of the combinations, and the number of the crossover averages in each sequence (D) is the same as the total number (I).

FIG. 7 shows one of the crossover average sequences (D) which is of the above-mentioned combination (C) shown in FIG. 6. In this crossover average sequences (D), namely, in the combination (C), the difference S between the maximum crossover average and the minimum crossover average is about 10.6 mm. With respect to each combination, the difference S is found.

Given that the averaged-pitches of the sequence (B) are $AP_i$ (i=1 to 74), as the phase shift Φ in this case is 39, the crossover averages $CA_i$ can be obtained as follows.

$$CA_i = (AP_i + AP_{i+39})/2$$

Figure 8:
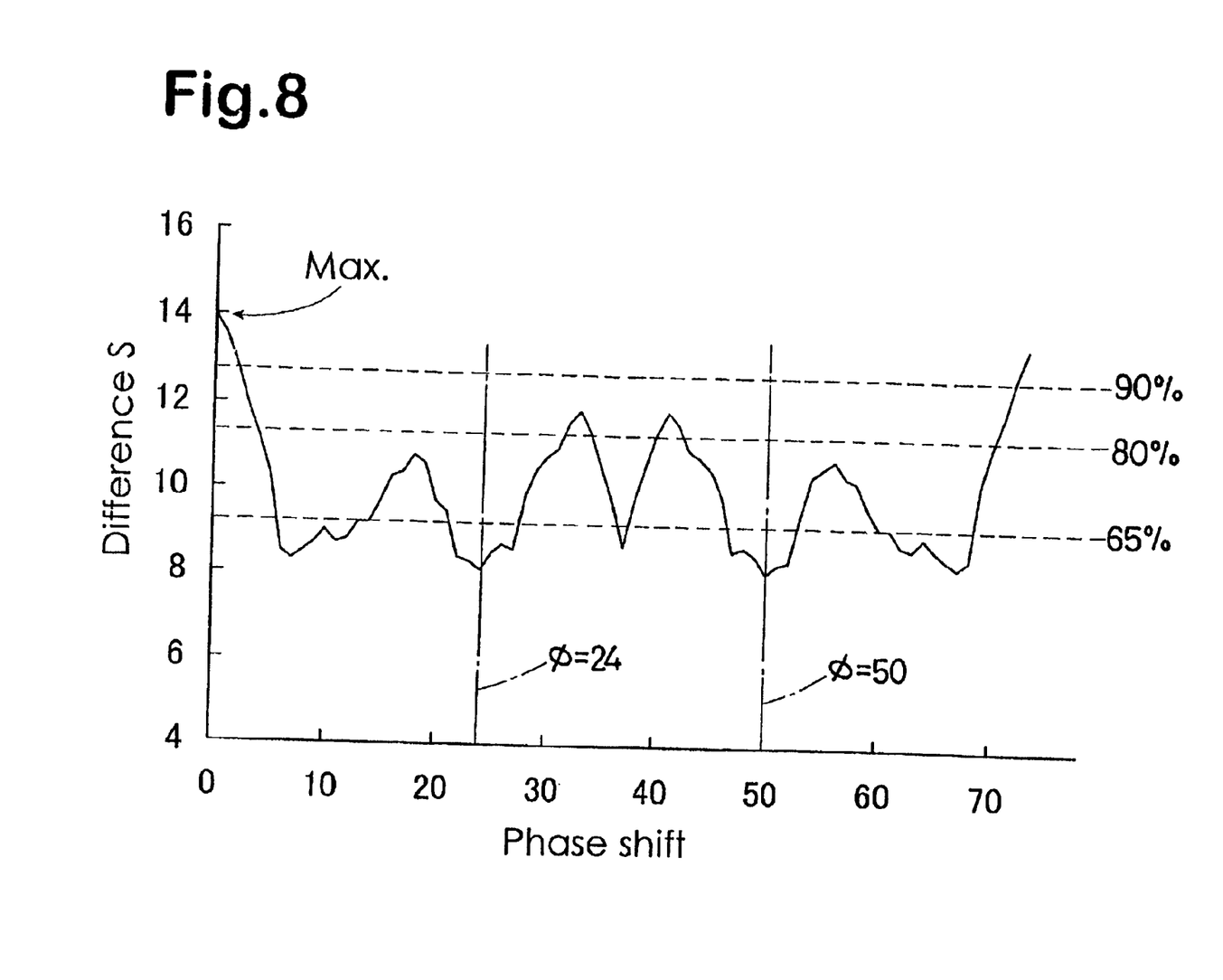
FIG. 8 is a graph showing the difference S as a function of the phase shift given in combining the averaged-pitch sequences.

FIG. 8 shows the difference S in mm as a function of the phase shift Φ, wherein the difference S is maximum when the phase shift φ=0, but the difference S becomes minimized when the phase shift φ=24 and 50. In this case, it is most desirable that the cyclic pattern in one of the regions 9 is circumferentially shifted from the cyclic pattern in the other region 9 by an angle corresponding to the phase shift φ=24 or 50, namely, about 360×24/74 or 360×50/74 degrees. However, the inventor also discovered that, by selecting a phase shift by which the difference S becomes less than 90% of the maximum difference S (preferably less than 80%, more preferably less than 65%), the circumferential distribution of the tread pattern rigidity can be effectively uniformed. Thus, such a phase shift is also selectable.

Figure 9:
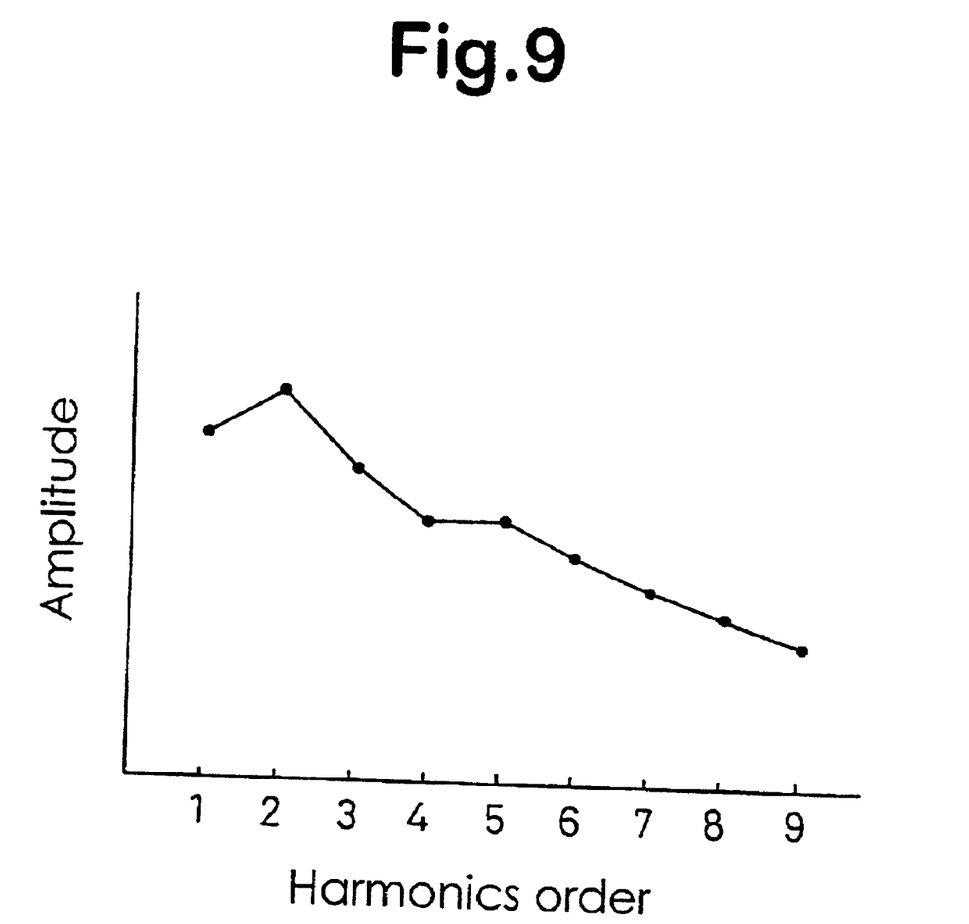
FIG. 9 is a graph showing the amplitude of harmonics of a waveform of a crossover average sequence such as shown in FIG. 7.

As to the above-mentioned averaged-pitch sequence (such as B in FIG. 5), if a particular harmonics order (N-th order) for example second harmonic is high in amplitude as shown in FIG. 9, it may be preferable that the influence of the N-th order harmonic from one region is cancelled by that from the other region by properly selecting the phase shift. In this case, with respect to each of the crossover average sequences (such as D in FIG. 7), a waveform (or a series of data) of the N-th order harmonic of the waveform of the envelope of the crossover averages is obtained by a Fourier expansion. Then, utilizing the obtained waveforms instead of the above-mentioned waveforms of crossover averages themselves, a waveform (phase shift) having a smaller difference is found as explained above.

In any way, when an optimum phase shift is found, the cyclic patterns (block patterns) of the circumferential regions 9 are rearranged such that the pitch sequence (B) of one of the regions 9 circumferentially shifts from the pitch sequence (B) of the other region 9 by the found phase shift for example about 117 (360×24/74) degrees if φ=24 is used.

Based on the rearranged cyclic patterns, the tread pattern is designed and a tire vulcanizing mold is made, and using the mold, a pneumatic tire is molded.

Comparison Test

Pneumatic tires of size 225/60R16 (Rim size: $7_{1/2}$JJX16, Pressure: 200 kPa) having the same tread pattern shown in FIG. 1 except for pitch sequences were made and tested for tire uniformity, noise performance and uneven wear resistance.

The specifications and test results are shown in Table 3.

1) Uniformity test

Using a high speed tire uniformity tester, the tangential force variation TFV in 1st to 4th harmonics order was measured at a speed of 120 km/hr. The results are indicated by an index based on Ref. tire being 100, wherein the smaller the index number, the better the tire uniformity.

2) Noise performance test

A 3000 cc Japanese passenger car provided on all the wheels with test tires was coasted on a smooth asphalt road at a speed of 60 km/hr, and the noise in the car was evaluated into five ranks by the test driver, wherein the larger the rank number, the better the noise performance.

3) uneven wear resistance test

After running for 3000 km under a controlled condition, the axial grooves 6 in the shoulder regions 9 were measured for the difference between the maximum groove depth and minimum groove depth. The difference is indicated by an index based on Ref. tire being 100, wherein the smaller the index number, the higher the uneven resistance.

TABLE 3

Figure 10:
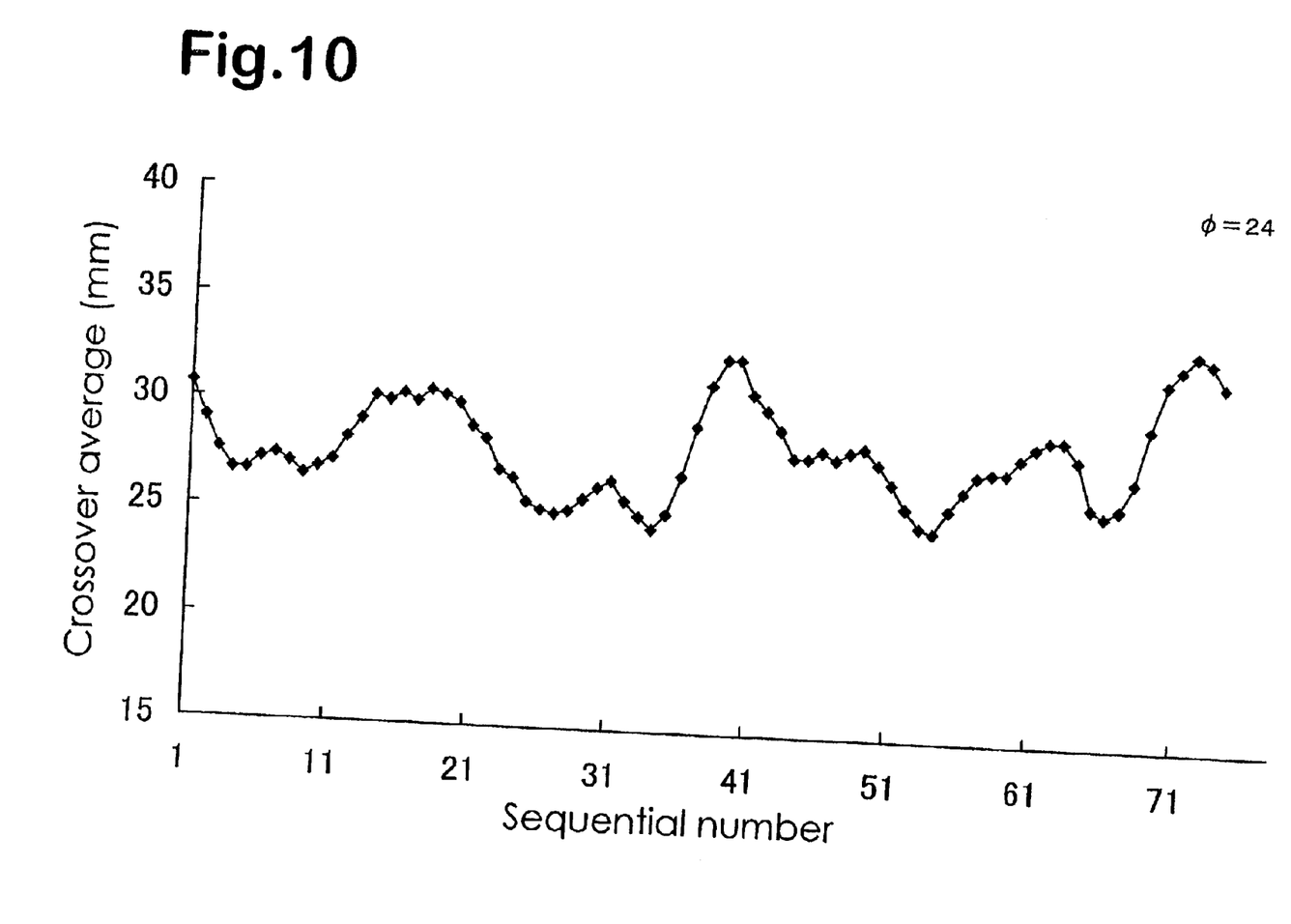
FIG. 10 shows a crossover average sequence of a test tire Ex. 2.
Figure 11:
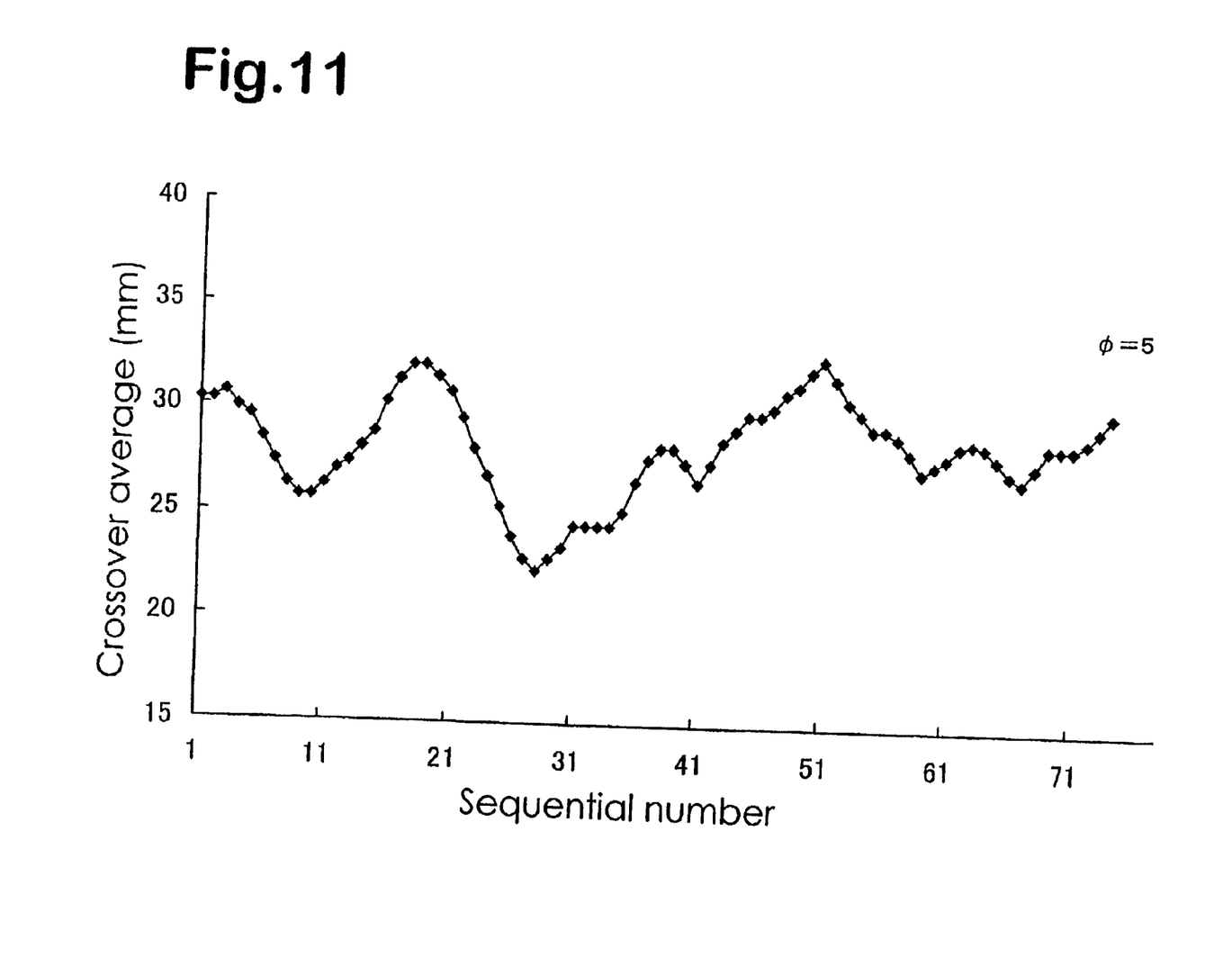
FIG. 11 shows a pitch sequence of the other region of a test tire Ex. 4
Figure 12:
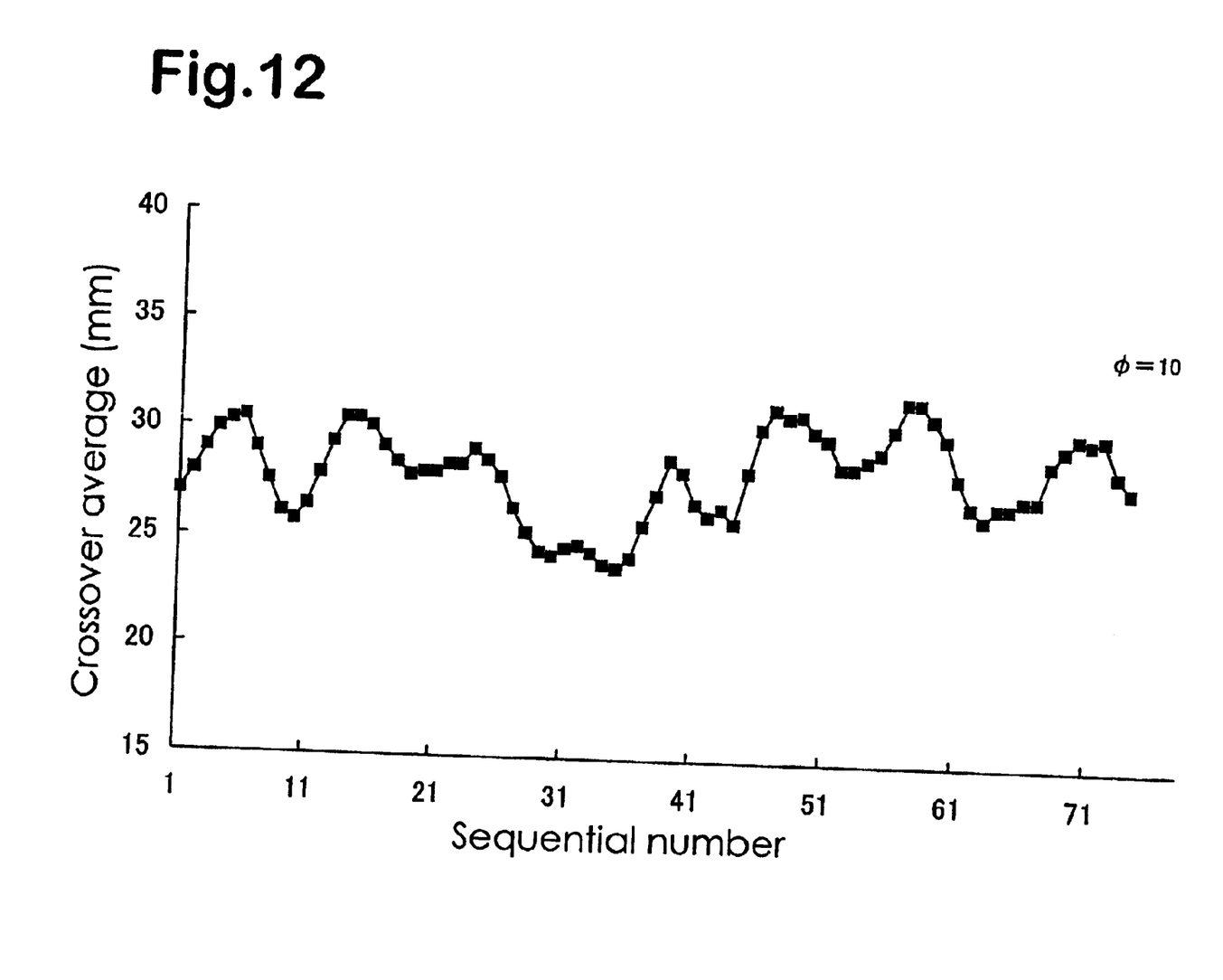
FIG. 12 shows a crossover average sequence of the test tire Ex. 4.

| Tire | | Ref. | Ex. 1 | Ex. 2 | Ex. 3 | Ex. 4 |
|---|---|---|---|---|---|---|
| Pitch sequence | | Table 1 | Table 1 | Table 1 | Table 1 | Table 1 |
| | | Table 1 | Table 1 | Table 1 | Table 1 | Table 4 |
| Averaged-pitch sequence | | Table 2 | Table 2 | Table 2 | Table 2 | Table 2 |
| | | Table 2 | Table 2 | Table 2 | Table 2 | Table 5 |
| Phase shift Ø | | 0 | 39 | 24 | 5 | 10 |
| Crossover average sequence | | — | FIG. 7 | FIG. 10 | FIG. 11 | FIG. 12 |
| Difference S (mm) | | 14 | 10.6 | 8.1 | 10.3 | 7.4 |
| TFV (index) | | | | | | |
| Harmonic order | 1st | 100 | 70 | 80 | 90 | 65 |
| | 2nd | 100 | 35 | 50 | 70 | 60 |
| | 3th | 100 | 60 | 120 | 100 | 40 |
| | 4th | 100 | 120 | 90 | 110 | 110 |
| Noise | | 3 | 3.5 | 3.4 | 3.2 | 3.5 |
| Uneven wear | | 100 | 92 | 95 | 96 | 90 |

TABLE 4

| 1 | 28.7 |
|---|---|
| 2 | 28.7 |
| 3 | 23.12 |
| 4 | 28.7 |
| 5 | 32.28 |
| 6 | 28.7 |
| 7 | 28.7 |
| 8 | 21.54 |
| 9 | 21.54 |
| 10 | 21.54 |
| 11 | 23.12 |
| 12 | 28.7 |
| 13 | 28.7 |
| 14 | 35.89 |
| 15 | 35.89 |
| 16 | 35.89 |
| 17 | 35.89 |
| 18 | 35.89 |
| 19 | 32.28 |
| 20 | 28.7 |
| 21 | 23.12 |
| 22 | 23.12 |
| 23 | 21.54 |
| 24 | 23.12 |
| 25 | 21.54 |
| 26 | 23.12 |
| 27 | 21.54 |
| 28 | 21.54 |
| 29 | 21.54 |
| 30 | 23.12 |
| 31 | 28.7 |
| 32 | 28.7 |
| 33 | 32.28 |
| 34 | 23.12 |
| 35 | 21.54 |
| 36 | 23.12 |
| 37 | 28.7 |
| 38 | 35.89 |
| 39 | 32.28 |

TABLE 4-continued

| 40 | 28.7 |
|---|---|
| 41 | 28.7 |
| 42 | 21.54 |
| 43 | 23.12 |
| 44 | 32.28 |
| 45 | 32.28 |
| 46 | 28.7 |
| 47 | 35.89 |
| 48 | 35.89 |
| 49 | 35.89 |
| 50 | 35.89 |
| 51 | 32.28 |
| 52 | 28.7 |
| 53 | 28.7 |
| 54 | 23.12 |
| 55 | 21.54 |
| 56 | 23.12 |
| 57 | 28.7 |
| 58 | 35.89 |
| 59 | 32.28 |
| 60 | 28.7 |
| 61 | 23.12 |
| 62 | 32.28 |
| 63 | 32.28 |
| 64 | 28.7 |
| 65 | 23.12 |
| 66 | 21.54 |
| 67 | 23.12 |
| 68 | 28.7 |
| 69 | 28.7 |
| 70 | 35.89 |
| 71 | 32.28 |
| 72 | 32.28 |
| 73 | 32.28 |
| 74 | 32.28 |

TABLE 5

| 1 | 28.3 |
|---|---|
| 2 | 28.3 |
| 3 | 28.3 |
| 4 | 27.98 |
| 5 | 26.55 |
| 6 | 24.4 |
| 7 | 23.29 |
| 8 | 23.29 |
| 9 | 24.72 |
| 10 | 27.59 |
| 11 | 30.46 |
| 12 | 33.01 |
| 13 | 34.45 |
| 14 | 35.89 |
| 15 | 35.17 |
| 16 | 33.73 |
| 17 | 31.18 |
| 18 | 28.62 |
| 19 | 25.75 |
| 20 | 23.92 |
| 21 | 22.49 |
| 22 | 22.49 |
| 23 | 22.17 |
| 24 | 22.17 |
| 25 | 21.86 |
| 26 | 22.17 |
| 27 | 23.29 |
| 28 | 24.72 |
| 29 | 26.87 |
| 30 | 27.18 |
| 31 | 26.87 |
| 32 | 25.75 |
| 33 | 35.75 |
| 34 | 24.47 |
| 35 | 26.31 |
| 36 | 27.74 |
| 37 | 28.85 |
| 38 | 27.42 |

TABLE 5-continued

| | |
|---|---|
| 39 | 26.87 |
| 40 | 26.87 |
| 41 | 27.58 |
| 42 | 27.58 |
| 43 | 30.45 |
| 44 | 33.01 |
| 45 | 33.73 |
| 46 | 34.45 |
| 47 | 35.17 |
| 48 | 33.73 |
| 49 | 32.29 |
| 50 | 29.74 |
| 51 | 26.87 |
| 52 | 25.04 |
| 53 | 25.04 |
| 54 | 26.47 |
| 55 | 28.31 |
| 56 | 29.74 |
| 57 | 29.74 |
| 58 | 30.45 |
| 59 | 29.73 |
| 60 | 29.02 |
| 61 | 27.9 |
| 62 | 27.58 |
| 63 | 25.75 |
| 64 | 25.04 |
| 65 | 25.04 |
| 66 | 27.54 |
| 67 | 29.74 |
| 68 | 31.57 |
| 69 | 32.29 |
| 70 | 33 |
| 71 | 31.56 |
| 72 | 30.85 |
| 73 | 29.02 |
| 74 | 28.3 |

What is claimed is:

1. In a method of arranging cyclic patterns in a tire tread, the tire tread comprising a number (P) of circumferential regions each provided with a cyclic pattern formed by circumferentially repeating a number (I) of design cycles having a number (J) of different pitch lengths, the pitch lengths of the design cycles in each said circumferential region arranged circumferentially of the tire in a sequence whereby the number (P) of sequences of the pitch lengths are defined, the improvement comprising:

obtaining, with respect to each of the design cycles, an averaged pitch of the pitch lengths of a number (n) of circumferentially subsequent design cycles to define a sequence of averaged pitches per each of the circumferential regions, whereby the number (P) of sequences of the averaged pitches are defined;

defining a number (Q) of combinations of the number (P) of the sequences of averaged pitches by changing phase between the sequences; obtaining, across the number (P) of the sequences of averaged pitches in each of the number (Q) of combinations, crossover averages of the averaged pitches of the number (P) of the sequences, whereby a series of the crossover averages is defined per each of the number (Q) of combinations;

a crossover average of averaged pitches, whereby said series of the crossover averages is defined per each of the combination;

obtaining, from said a series of the crossover averages, a difference between a maximum and a minimum of the crossover averages or alternatively between a maximum and a minimum of the amplitude of a harmonic of said a series of the crossover averages, with respect to each of the combinations;

finding, from the differences of the combinations, a combination having a smaller difference to determine the phase shift given to the sequences of averaged pitches in making the combination; and rearranging the cyclic patterns of the circumferential regions in accordance with the found phase shift.

2. The method according to claim 1, which comprises determining the number (n) of the circumferentially subsequent design cycles such that the total circumferential length of the subsequent design cycles is substantially equal to the ground contacting length of the tire tread.

3. The method according to claim 1, wherein the number (n) of the circumferentially subsequent design cycles is in a range of from 3 to 7.

4. The method according to claim 1, wherein said difference is a difference between a maximum and a minimum of the amplitude of the harmonic, and the harmonic is the fundamental harmonic.

5. The method according to claim 1, wherein in said step of obtaining a difference from said series of the crossover averages,
said difference is a difference between a maximum and a minimum of the amplitude of the harmonic, and the harmonic is a higher harmonic such as second harmonic, third harmonic and forth harmonic.

6. The method according to claim 1, wherein said finding of a combination having a smaller difference comprises:
finding a maximum difference from said differences of the combinations,
determining a standard difference based on the maximum difference, and
selecting a combination having a difference under the standard difference.

7. The method according to claim 6, wherein the standard difference is 90% of the maximum difference.

8. The method according to claim 6, wherein the standard difference is 80% of the maximum difference.

9. The method according to claim 6, wherein the standard difference is 65% of the maximum difference.

10. The method according to claim 1, wherein all the pitch lengths' sequences of the circumferential regions are identical.

11. The method according to claim 1, wherein all the pitch lengths' sequences of the circumferential regions are different from one another.

12. The method according to claim 1, wherein at least one of the pitch lengths' sequences of the circumferential regions is different from the rest.

13. The method according to claim 10 or 11, wherein the number (P) of circumferential regions is two.

14. The method according to claim 1, wherein at least one of the pitch lengths' sequences of the circumferential regions has a periodic pitch length variation.

15. The method according to claim 1, wherein at least one of the pitch lengths' sequences of the circumferential regions has an irregular pitch length variation.

16. The method according to claim 1, wherein the circumferential regions have the substantially same axial width.

* * * * *